United States Patent [19]

Lee

[11] Patent Number: 5,546,134
[45] Date of Patent: Aug. 13, 1996

[54] VIDEO BRIGHTNESS/CONTRAST ENHANCEMENT METHOD ADAPTIVE TO A SCENE AND CIRCUIT THEREFOR

[75] Inventor: Myeong-hwan Lee, Suwon, Rep. of Korea

[73] Assignee: Samsung Electronics Co., Ltd., Kyungki-do, Rep. of Korea

[21] Appl. No.: 348,926

[22] Filed: Nov. 25, 1994

[30] Foreign Application Priority Data

Nov. 24, 1993 [KR] Rep. of Korea ............. 93-25127

[51] Int. Cl.⁶ .................................................. H04N 5/14
[52] U.S. Cl. ................................. 348/673; 348/687
[58] Field of Search ................................ 348/676, 624, 348/673, 223, 687; H04N 5/14

[56] References Cited

U.S. PATENT DOCUMENTS

| | | | |
|---|---|---|---|
| 3,947,631 | 3/1976 | Rhee et al. | 348/673 |
| 4,394,689 | 6/1983 | Wallace et al. | 348/687 |
| 4,489,349 | 12/1984 | Okada | 348/676 |
| 5,227,870 | 6/1993 | Asada et al. | 348/223 |
| 5,289,282 | 2/1994 | Tsuji et al. | 348/624 |

*Primary Examiner*—Victor R. Kostak
*Attorney, Agent, or Firm*—Sughrue, Mion, Zinn, Macpeak & Seas

[57] ABSTRACT

The present invention relates to an image enhancement circuit which adaptively controls the brightness and contrast of a video input signal according to its average brightness level. The circuit calculates the average brightness level during a predetermined period with respect to a video signal to be input through an input terminal and controls the brightness and contrast of the video input signal according to brightness correction characteristics corresponding to the calculated average brightness level, in which the range of the average brightness level in the video input signal is divided into a plurality of areas, and a plurality of input-output characteristic curves are provided so that the brightness and contrast of the video input signal is differently corrected for respective areas. The present invention naturally displays even a dimly lit picture by preventing an abrupt variation in brightness, and provides pictures with enhanced brightness and contrast by adjusting only the contrast at a particular nAPL range.

17 Claims, 4 Drawing Sheets

VIDEO BRIGHTNESS/CONTRAST ENHANCEMENT METHOD ADAPTIVE TO A SCENE AND CIRCUIT THEREFOR

BACKGROUND OF THE INVENTION

The present invention relates to a method and circuit for controlling the brightness and contrast of a video signal, and more particularly relates to a method and circuit in which the brightness and contrast of a video signal are adaptively controlled according to the average brightness level of a picture.

Natural illumination can have an extremely wide brightness range, and has a vast range of contrast scales. The human eye adapts itself remarkably well for viewing naturally-lit objects and can easily perceive detail in shadows. Nevertheless, cameras or televisions are not easily adaptable to conditions of natural illumination. Color cameras can be responsive to input light having a specific illumination range, but an electric output signal of the camera is limited to a range of, for example, 1 volt peak-to-peak. A conventional display apparatus often displays a picture poor in quality because its contrast range is extremely narrow.

To solve this problem, a contrast correction arrangement is provided in U.S. Pat. No. 4,152,720 and a video brightness control circuit for controlling contrast according to a brightness adjustment is disclosed by U.S. Pat. No. 4,489,349. In the contrast correction apparatus of U.S. Pat. No. 4,152,720, relative contrast enhancement has been achieved by adjusting input-output characteristics of the video signal according to external control values for a camera determined by a user. FIG. 1 is a graph showing input-output characteristics used in a conventional contrast correction apparatus, which shows two characteristic curves y1 and y2 expressed as $y1(x) = X^{0.5}$ and $y2(x)=X^2$. The prior art relating to FIG. 1 improves the contrast based on the brightness control. In fact, contrast enhancement is partially accomplished just as an additional effect of the brightness control. Thus, there arises the problem of a manual operation.

The video brightness control circuit of U.S. Pat. No. 4,489,349 controls the input-output characteristic according to the average picture level (APL) of a video input signal, as in U.S. Pat. No. 4,152,720. Adaptively operating according to the APL is different from the operation of U.S. Pat. No. 4,152,720, but the resultant effect is similar. FIG. 2 shows the input-output characteristic of U.S. Pat. No. 4,489,349, with the input-output characteristic given as $$OUT=nAPL \times y2(x)+(1-nAPL) \times y1(x)$$

where, nAPL is a normalized average picture level, i.e., the average picture level of a video input signal, and y1(x) and y2(x) are input-output characteristic curves as shown in FIG. 1. The relationship expresses the output OUT in which y1(x) and y2(x) are weighted to nAPL and 1−nAPL. For example, when the nAPL is 0.3, the output OUT becomes $0.3 \times y2(x)+0.7 \times y1(x)$, and when the nAPL is 0.7, the output OUT becomes $0.7 \times y2(x)+0.3 \times y1(x)$. Accordingly, when nAPL has a low value, such as 0.3, a total value of the APL increases as the first characteristic curve y1 is weighted, whereas when nAPL has a value of 0.7, for example, a total value of the APL decreases as the second characteristic curve y2 is weighted.

In FIG. 2, variations are positive when the nAPL is less than 0.5, and they are negative when the nAPL is larger than 0.5. The variation is added to an original signal. The closer the nAPL is to 0 or 1, the more the average picture level of the video input signal is varied, whereas the average picture level is varied little when the nAPL is around 0.5. This technique also controls the contrast using the average picture level relative to the picture brightness, but has a drawback in that contrast efficiency drops due to an overemphasis of brightness. Therefore, there is a disadvantage that an extremely dark scene, such as night scenery, provides a poor, undesirable picture due to brightness extension.

SUMMARY OF THE INVENTION

Therefore, to solve the above problems, it is an object of the present invention to provide an image enhancement method adaptive to a scene which divides a range of an average picture level in a video input signal into a plurality of areas, sets a different input-output characteristic for each of the divided areas, and controls the brightness and contrast of the video input signal according to the input-output characteristic of an area corresponding to the average picture level of a video input signal, thereby obtaining a picture with more advanced contrast than the conventional technique.

Another object of the present invention is to provide an image enhancement circuit in order to embody the above method.

To accomplish one object of the present invention, there is provided an image enhancement method which controls the brightness and contrast of a video signal using an average brightness level, the method comprising the steps of:

dividing a range of the average brightness level in a video input signal into a plurality of areas; setting a different brightness correction characteristic for each of the divided areas; calculating the average brightness level during a predetermined period with respect to the video input signal; and controlling the brightness and contrast of the video input signal according to the brightness correction characteristic corresponding to the calculated average brightness level.

Another object of the present invention is accomplished by providing an image enhancement circuit which controls and outputs the brightness and contrast of a video signal using an average brightness level, the circuit comprising:

calculating means for calculating the average brightness level during a predetermined period with respect to a video signal to be input through an input terminal; and controlling means for controlling the brightness and contrast of the video input signal according to brightness correction characteristics corresponding to the calculated average brightness level, in which the range of the average brightness level in the video input signal is divided into a plurality of areas, and a plurality of input-output characteristic curves are provided so that the brightness and contrast of the video input signal is differently corrected for respective areas.

DETAILED DESCRIPTION OF THE PREFERRED EMBODIMENT

A preferred embodiment of the present invention will be described below in more detail with reference to the accompanying drawings.

Figure 1:
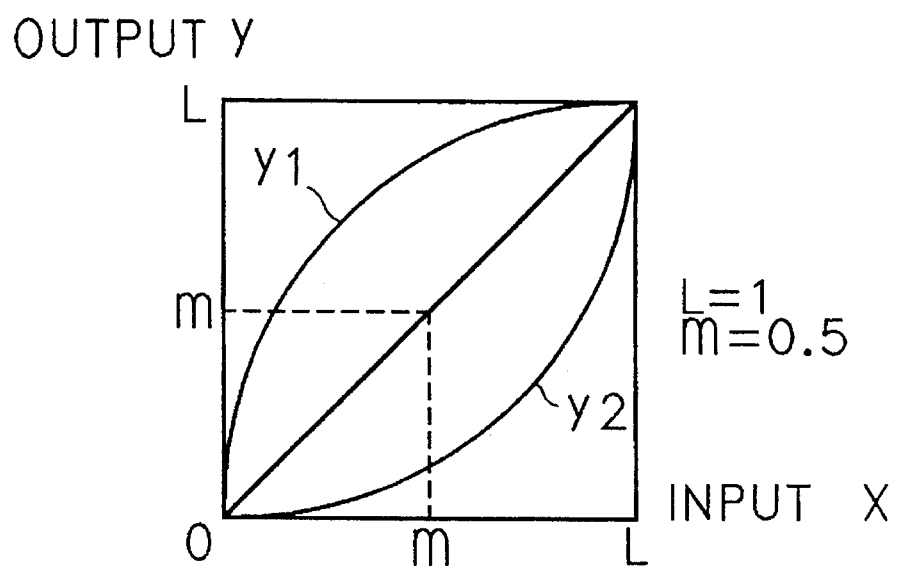
FIG. 1 is a graph showing input-output characteristics used in a conventional contrast correction apparatus.
Figure 2:
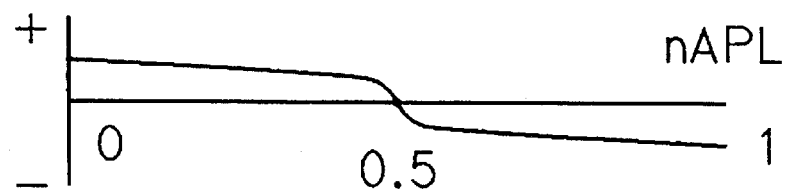
FIG. 2 is a graph showing brightness correction characteristics used in a conventional video brightness control circuit.
Figure 3:
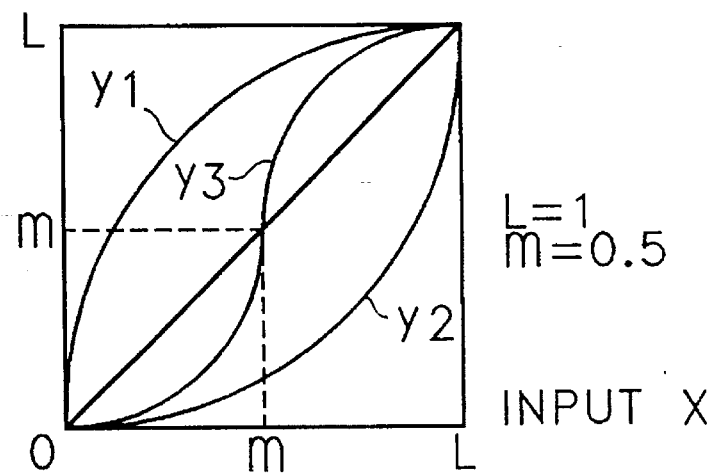
FIG. 3 is a graph showing input-output characteristics used in the present invention.

FIG. 3 is a graph showing input-output characteristics used in the present invention. In FIG. 3, two curves y1, y2 are the same as the input-output characteristics curves of FIG. 1, and an S-shaped curve represents an input-output characteristic curve added to the present invention so as to adjust brightness and contrast using an average picture level. A first characteristic curve y1 causes a total increase in brightness of the input signal and a relative contrast enhancement effect of low level values. A second characteristic curve y2 results in an overall decrease in brightness of the input signal and a relative contrast enhancement effect of high level values. A third characteristic curve y3 effects an overall increase in contrast.

Figure 4:
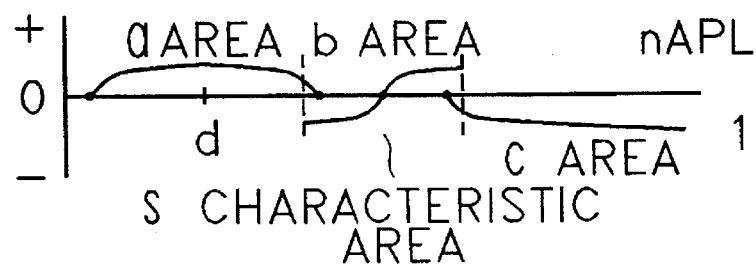
FIG. 4 is a graph showing brightness correction characteristics of an image enhancement circuit in accordance with the present invention.

FIG. 4 shows a graph illustrating the correction characteristic of brightness and contrast in the image enhancement method in accordance with the present invention. The characteristic curve of FIG. 4 illustrates that contrast adjustment using the input-output characteristic curves y1, y2 and y3 is performed at the respective divided areas of the nAPL. The invention divides a range of the average picture level in the video input signal into four areas and allows for each area a respective brightness correction characteristic which is determined by the nAPL of the video input signal, input-output characteristic curves of FIG. 3 and weighted values peculiar to that area. The video input signal is adjusted in brightness and contrast by the brightness correction characteristics. As a result, a video signal with enhanced contrast is obtained. The input-output characteristic curves for an embodiment of the present invention will be expressed as $y1(x)=X^{0.5}$  $y2(x)=x^2$
$y3_L(x)=X_L^2$  $y3_H(x)=x_H^{0.5}$ where $x_L$ is in the range of 0~0.5 and $x_H$ is in the range of 0.5 to 1. In the above equations, it is not necessary to limit the exponents to 0.5 or 2, other values may be used.

As shown in FIG. 4, the present invention may be divided into four areas. Boundaries of these areas can be properly selected according to the brightness and contrast corrections. In FIG. 4, it is understood that an area exists having an nAPL smaller than that corresponding to the area 'a'. An explanation of the input-output characteristic curves which are employed in the enhancement of each area will be given as follows. For brightness and contrast corrections, when the nAPL value is within an area 'a', the first characteristic curve y1 is selected. When the nAPL value is within an area 'b' the third characteristic curve y3 is selected, and when the nAPL value is within an area 'c' the second characteristic curve y2 is chosen.

The use of the input-output characteristic curves of FIG. 3 for contrast adjustment will be described for each area of FIG. 4. The area where the nAPL is smaller than that of the 'a' area has an nAPL value obtained from the darkest portion of a picture. In this area, the level of an input signal is equal to that of an output signal. Thus, the brightness of input and output signals is the same to prevent undesirable pictures.

For example, the output signal OUT of the 'a' area will be given as the following expression (1):

$$OUT=|(p-q)/p|\times y1(x) \qquad (1)$$

where p is defined as (an interval of 'a' area)/2, and q is la central value of 'a' area nAPL|. The central value of 'a' area may be expressed as 'd' in FIG. 4. The above expression (1) shows that a weighted value of the first characteristic curve y1 is determined by a half of the 'a' area interval, and by an absolute value of the difference between the central value of the 'a' area and the nAPL value. Accordingly, the output signal OUT becomes y1(x) when the nAPL value is in the middle of the 'a' area, and the output signal OUT becomes $c \times y1(x)$ by means of a normalized form of $c=|p-q|/p<1$ when the nAPL value is far from the middle of the 'a' area. The characteristic curve of the expression (1) is shown within the 'b' area of FIG. 4. The characteristic of the expression (1) smoothly connects characteristics of the areas 'a' and 'b' together with an 'S' characteristic of the 'b' area. The input-output characteristic of the expression (1) generally increases from the left to right, the central value 'd' of the 'a' area is at the maximum in the variations of the input-output characteristics. In the 'b' area, since the nAPL value of the input signal is close to 0.5, the characteristic curve 'S' contributes to the contrast enhancement. Thus, the output signal OUT may be obtained by the following expressions (2) and (3) on the basis of the nAPL value being 0.5.

$$OUT=y3(x) \qquad (2)$$

$$OUT=amp\times|m-|nAPL-m||\times y3(x) \qquad (3)$$

where m is normally 0.5 and amp is an amplification ratio. The output signal in a further advanced form is adaptably calculated according to the nAPL value given by $$OUT=amp1\times|m-|m-nAPL(1)||\times y3_L(x)+amp2\times|m-|nAPL(h)-m||\times y3_h(x) \qquad (4)$$

where, nAPL(1) and nAPL(h) represent that the nAPL value is calculated by respectively classifying the video input signal having the level above and below 'm', and $y3_L$ and $y3_h$ indicates that the third characteristic curve y3 is divided at 'm'. The 'c' area is obtained by the following expression (5) which is dependent on the second characteristic curve y2 according to a value of nAPL−m;

$$OUT=amp\times|nAPL-m|\times y2(x) \qquad (5)$$

The input signal is corrected by the expressions of the corresponding area with the calculated nAPL value. In FIG. 4, the characteristic curve of the 'c' area exists in the 'b' area to make the characteristic variations between the 'b' and 'c' areas smooth.

On the other hand, the brightness correction characteristics of the 'a' area and the rest can be calculated by $$OUT=(0.5-nAPL)\times y1(x) \qquad (6)$$

Figure 5:
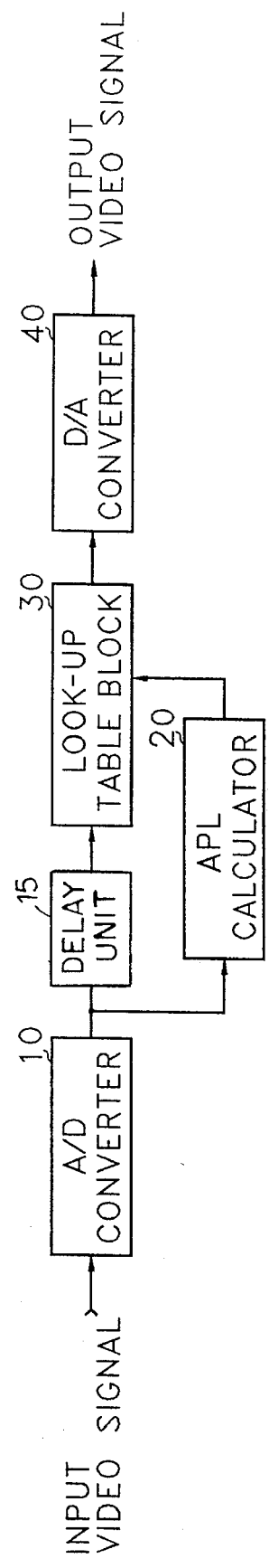
FIG. 5 is a block diagram for illustrating a first embodiment of an image enhancement circuit in accordance with the present invention.

FIG. 5 is a block diagram for illustrating a first embodiment of the image enhancement circuit in accordance with the present invention. As shown, an analog to digital converter 10 converts an analog video input signal into a digital video signal which is output to an average picture level (APL) calculator 20 and a look-up table block 30. The APL calculator 20 receives the video signal output from the A/D converter 10 and calculates an nAPL value. The look-up table block 30 corrects and outputs the output signal from the A/D converter 10 according to the output APL value from the APL calculator 20. The output signal of the look-up table block 30 is supplied to a digital to analog converter 40 and is converted into an analog video signal.

The video signal input to the image enhancement circuit of FIG. 5 is converted into a digital signal by the A/D converter 10, and then the converted digital signal is supplied to the APL calculator 20 and the look-up table block 30, respectively. The APL calculator 20 calculates an nAPL value of the video input signal with respect to the real interval of a video signal during one frame period or a plurality of frame periods. At this time, the nAPL value is continuously reproduced for every input frame. The look-up table block 30 stores the brightness correction characteristics, which relate to the four areas, in the form of a look-up table in which the video input signal is designated by address, and corrects and outputs the brightness of the video input signal according to the level of the video input signal and the corresponding nAPL value. Therefore, when the nAPL value is supplied from the APL calculator 20, the look-up table block 30 judges a corresponding area of the input value, and corrects and outputs the input digital video signal according to the brightness correction characteristic of the corresponding area. One of ordinary skill in the art can construct the look-up table block 30 using many areas, or can employ various methods based on the expressions corresponding to each area.

The digital data read out from the look-up table block 30 is provided to the D/A converter 40, and is converted into an analog video signal. Here, the output video signal of the D/A converter 40 is corrected in brightness and contrast. In the circuit of FIG. 5, although a frame with the calculated nAPL value is different from a frame that is actually input to the look-up table block 30, there is generally not any problem since video signals between adjacent frames are varied smoothly. However, in the case of an abrupt transition of the video signal, such as occurs during a scene change, or when brightness correction for the video signal of the calculated nAPL value may be performed, a delay unit 15 is connected between A/D converter 10 and look-up table block 30. The delay element delays the video signal output from the A/D converter 10 during the time the nAPL value is calculated.

Figure 6:
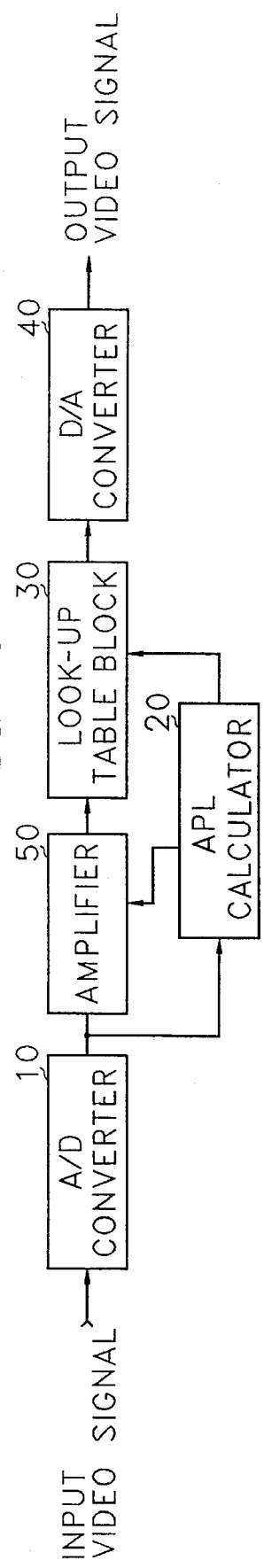
FIG. 6 is a block diagram for illustrating a second embodiment of an image enhancement circuit in accordance with the present invention.

FIG. 6 is a block diagram for illustrating a second embodiment of an image enhancement circuit in accordance with the present invention. Blocks of the image enhancement circuit of FIG. 6 which have the same construction and function as in FIG. 5 are designated with the same reference numerals. An amplifier 50 is further added between A/D converter 10 and look-up table block 30. The amplifier 50 amplifies the video signal output from the A/D converter 10 with a variable amplification ratio which is determined by the nAPL value provided from the APL calculator 20, and outputs the amplified signal to the look-up table block 30.

Figure 7:
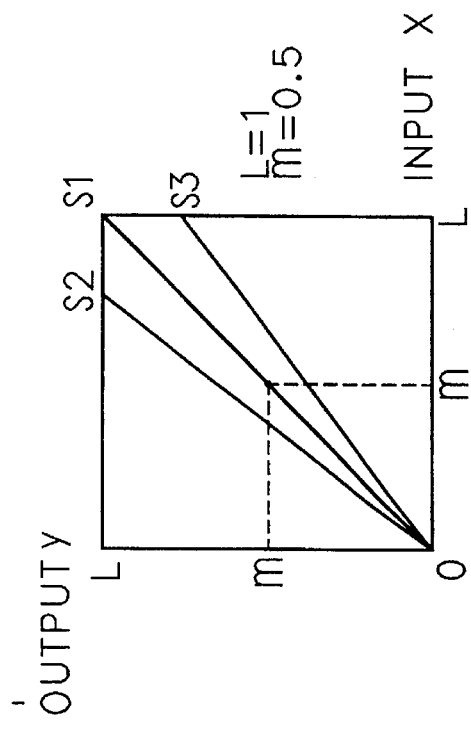
FIG. 7 is a graph showing input-output characteristic curves of an amplifier of FIG. 6.

FIG. 7 is a graph showing input-output characteristic curves of the amplifier 50. The amplifier 50 changes the amplification ratio of the video input signal in the direction 's3' when the nAPL value supplied from the APL calculator 20 is at or near '1', and it amplifies the video input signal in the direction 's2' if the nAPL value is not near '1'. This results in controlling the level condition in a scene which is brightly lit and thereby improves correction efficiency compared with the apparatus of FIG. 5.

Figure 8:
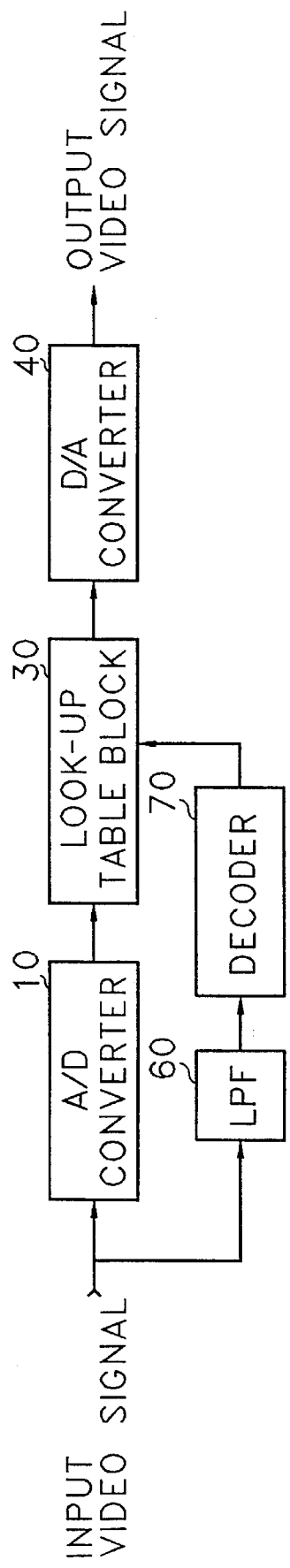
FIG. 8 is a block diagram for illustrating a third embodiment of an image enhancement circuit in accordance with the present invention.

FIG. 8 is a block diagram for illustrating a third embodiment of an image enhancement circuit in accordance with the present invention. Blocks of the image enhancement circuit of FIG. 8 which have the same construction and function as in FIG. 5 are designated with the same reference numerals. However, the APL calculator 20 of FIG. 5 is substituted by a low-pass filter (LPF) 60 and a decoder 70. The LPF 60 calculates an approximate nAPL value and then roughly counts a value of portions which do not correspond to picture information, such as a horizontal synchronizing period and a vertical blanking period, and subtracts the counted value from the nAPL value, thereby providing the correction.

The LPF 60 calculates an nAPL value of the video input signal with respect to the real interval of a video signal during one frame period or a plurality of frame periods. The calculated nAPL value is output to the decoder 70 as voltage. The decoder 70 outputs a signal to control the look-up table block 30 by the voltage supplied from the LPF 60.

As described above, the present invention adaptively corrects the brightness by individually permitting input-output characteristics which differ according to values of the average brightness level of a video input signal, and thereby obtains a video signal with enhanced contrast. The present invention allows even a dimly-lit picture to be displayed by preventing an abrupt variation in brightness, and provides pictures with enhanced brightness and contrast produced by adjusting only the contrast at a particular nAPL range. Furthermore, the invention can improve correction efficiency of the brightness and contrast by controlling an amplification ratio of the video signal.

What is claimed is:

1. An image enhancement method which is adaptive to a scene and which controls brightness and contrast of a video signal using an average brightness level, the method comprising the steps:

dividing a range of the average brightness level in a video input signal into a plurality of areas;

setting an individually different brightness correction characteristic to each of said divided areas;

calculating the average brightness level with respect to the video input signal; and controlling the brightness and contrast of the video input signal according to the brightness correction characteristic corresponding to said calculated average brightness level, wherein said video input signal is corrected by the following expression for contrast enhancement when the calculated average brightness level is at or near '0.5':

OUT=$y^3(x)$
$y3(x)=X_L^2$  $y3(x)=X_H^{0.5}$ where, said OUT is a corrected video signal, $x_L$ represents an area where an nAPL value of the video signal is in a range of 0 to 0.5, and $x_H$ represents an area where the nAPL valve of the video signal is in a range of 0.5 to 1.

2. The image enhancement method as claimed in claim 1, wherein said area dividing step comprises the step of dividing the average brightness level range of the video input signal into a plurality of areas according to efficiency of contrast enhancement.

3. An image enhancement method which is adaptive to a scene and which controls brightness and contrast of a video signal using an average brightness level, the method comprising the steps:

dividing a range of the average brightness level in a video input signal into a plurality of areas according to efficiency of contrast enhancement;

setting an individually different brightness correction characteristic to each of said divided areas;

calculating the average brightness level with respect to the video input signal; and controlling the brightness and contrast of the video input signal according to the brightness correction characteristic corresponding to said calculated average brightness level, wherein said areas are composed of a first area with the average brightness level corresponding to a dark scene, a second area of an intermediate average brightness level, a third area with the average brightness level between said first and second areas and a fourth area with the average brightness level above said second area, and when the range of the average brightness level in the video input signal is between 0 and 1, said first area has average brightness levels around '0' and said second area has average brightness levels at or near '0.5'.

4. The image enhancement method as claimed in claim 3, wherein said brightness and contrast controlling step comprises the step of outputting the video input signal without change, in the case that the calculated average brightness level is within said first area.

5. The image enhancement method as claimed in claim 3, wherein said brightness and contrast controlling step comprises the step of correcting said video input signal by the following expression for contrast enhancement when the calculated average brightness level is within said second area:

out=$y^3(x)$ $y3(x)=X_L^2$   $y3(x)=X_H^{0.5}$ where, said OUT is a corrected video signal, $x_L$ represents an area where an nAPL value of the video signal is in a range of 0 to 0.5, and $x_H$ represents an area where the nAPL value of the video signal is in a range of 0.5 to 1.

6. The image enhancement method as claimed in claim 3, wherein said brightness and contrast controlling step comprises the step of correcting the video input signal by the following expression for contrast enhancement when the calculated average brightness level is within said second area:

OUT=amp×abs[m−abs(nAPL−m)]×y3(x)

$y3(x)=X_L^2$, $y3(x)=X_H^{0.5}$ where, said OUT is a corrected video signal, amp is an amplification ratio, abs is an absolute value, nAPL is a normalized average picture level value, m is generally 0.5, $x_L$ represents an area where an nAPL value of the video signal is in a range of 0 to 0.5, and $x_H$ represents an area where an nAPL valve of the video signal is in a range of 0.5 to 1.

7. The image enhancement method as claimed in claim 3, wherein said brightness and contrast controlling step comprises the step of correcting the video input signal by the following expression for contrast enhancement, when the calculated average brightness level is within said second area:

OUT=amp1×abs(m−abs(m−nAPL(1))) X $y3_L(x)$+amp2× abs(m−abs(nAPL(h)−m))×$y3_h(x)$ $y3_L(x)=X_L^2$, $y3_h(x)=X_H^{0.5}$ where, said OUT is a corrected video signal, m is generally 0.5, amp1 and amp2 are amplification ratios corresponding to an nAPL above and below 'm', respectively, abs is an absolute value, nAPL(1) and nAPL(h) are normalized average picture level values obtained by respectively calculating the video input signal above and below 'm', $x_L$ represents an area where the nAPL value of the video signal is in a range of 0 to 0.5, and $x_H$ represents an area where the nAPL valve of the video signal is in a range of 0.5 to 1.

8. The image enhancement method as claimed in claim 3, wherein said brightness and contrast controlling step comprises the step of correcting the video input signal by the following expression for contrast enhancement when the calculated average brightness level is within said third area:

OUT=abs(abs(p−q)/p)×y1(x), $y1(x)=X^{0.5}$ p=(area range)/2, q=abs(area center−nAPL)

where, nAPL is a normalized APL value, said OUT is a corrected video signal, abs is an absolute value, area-range represents a range of values of said nAPL in said third area, and area center is a central value of nAPL in said third area.

9. The image enhancement method as claimed in claim 3, wherein said brightness and contrast controlling step comprises the step of correcting the video input signal by the following expression for contrast enhancement when the calculated average brightness level is within said first area or said third area:

OUT=(0.5−nAPL)×y1(x), $y1(x)=X^{0.5}$ where, said OUT is a corrected video signal, and nAPL is a normalized APL value.

10. The image enhancement method as claimed in claim 3, wherein said brightness and contrast controlling step comprises the step of correcting the video input signal by the following expression for contrast enhancement when the calculated average brightness level is within said fourth area:

OUT=amp×abs(nAPL−m)×y2(x), $y(x)=X^2$ where, said OUT is a corrected video signal, m is generally 0.5, amp is an amplification ratio, abs is an absolute value, and nAPL is a normalized APL value.

11. An image enhancement circuit adaptive to a scene which controls and outputs the brightness and contrast of a video signal using an average brightness level, the circuit comprising:

calculating means for calculating the average brightness level with respect to a video signal to be input through an input terminal; and controlling means for controlling the brightness and contrast of the video input signal according to brightness correction characteristics corresponding to said calculated average brightness level, in which a range of said average brightness level of said video input signal is divided into a plurality of areas, and a plurality of input-output characteristic curves are provided so that the brightness and contrast of said video input signal is differently corrected for respective areas, wherein said video input signal is corrected by the following expression for contrast enhancement when the calculated average brightness level is at or near '0.5':

OUT=$y^3(x)$ $y3(x)=X_L^2$   $y3(x)=X_H^{0.5}$ where, said OUT is a corrected video signal, $x_L$ represents an area where an nAPL value of the video signal is in a range of 0 to 0.5, and $x_H$ represents an area where the nAPL valve of the video signal is in a range of 0.5 to 1.

12. The image enhancement circuit as claimed in claim 11, wherein said brightness and contrast controlling means stores each of brightness correction characteristics corresponding to said average brightness level in a format of a look-up table which is composed of a video output signal corresponding to a video input signal.

13. The image enhancement circuit as claimed in claim 11, wherein said brightness and contrast controlling means corrects the brightness and contrast of a video signal to be input following the video input signal which is used in calculating the average brightness level.

14. The image enhancement circuit as claimed in claim 11, further comprising a delay unit, which operates before said brightness and contrast controlling means, operates, for delaying and outputting the video input signal from said input terminal so that the brightness and contrast of the video input signal used in calculating the average brightness level can be controlled.

15. The image enhancement circuit as claimed in claim 11, further comprising an amplifier which amplifies said video input signal with an amplification ratio which is varied according to the average brightness level calculated by said average brightness level calculating means, and outputs the amplified signal to said brightness and contrast controlling means.

16. The image enhancement circuit as claimed in claim 15, wherein said amplifier amplifies said video input signal so that the slope of an input-output characteristic curve becomes low when the calculated value of said average brightness level is near '1', and said amplifier amplifies said video input signal so that the slope of an input-output characteristic curve becomes high when the calculated value of said average brightness level is close to '0'.

17. The image enhancement circuit as claimed in claim 11, wherein said average brightness level calculating means comprises a low-pass filter for counting a value of the average brightness level by passing through only low components of the video input signal, and for outputting corresponding voltage; and a decoder for outputting a control signal to control said brightness and contrast controlling means according to said voltage supplied from said low-pass filter.

* * * * *